(12) United States Patent
Yang et al.

(10) Patent No.: US 6,862,155 B2
(45) Date of Patent: Mar. 1, 2005

(54) SQUEEZE EVALUATIONS THAT ACCOUNT FOR LOW FREQUENCY COMPONENTS, IN A CONTROLLER USABLE IN A DATA HANDLING SYSTEM

(75) Inventors: Yong Y. Yang, Singapore (SG); Qiang Bi, Singapore (SG); Xiong Liu, Singapore (SG); ChoonKiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 175 days.

(21) Appl. No.: 10/401,358

(22) Filed: Mar. 26, 2003

(65) Prior Publication Data

US 2004/0090699 A1 May 13, 2004

Related U.S. Application Data

(60) Provisional application No. 60/424,581, filed on Nov. 7, 2002.

(51) Int. Cl.[7] .............................................. G11B 5/596
(52) U.S. Cl. ................................................... 360/77.02
(58) Field of Search ........................... 360/77.02, 77.04, 360/78.04, 31

(56) References Cited

U.S. PATENT DOCUMENTS

| | | |
|---|---|---|
| 5,321,570 A | 6/1994 | Behr et al. |
| 5,568,331 A | 10/1996 | Akagi et al. |
| 5,585,976 A | 12/1996 | Pham |
| 5,602,689 A | 2/1997 | Kadlec et al. |
| 5,638,230 A | 6/1997 | Kadlec |
| 5,646,797 A | 7/1997 | Kadlec et al. |
| 5,677,809 A | 10/1997 | Kadlec |
| 5,796,535 A | 8/1998 | Tuttle et al. |
| 5,901,010 A | 5/1999 | Glover et al. |
| 5,903,408 A | 5/1999 | Omi |
| 5,914,830 A | 6/1999 | Kadlec et al. |
| 5,926,338 A | 7/1999 | Jeon et al. |
| 5,949,605 A | 9/1999 | Lee et al. |
| 6,025,970 A | 2/2000 | Cheung |
| 6,069,764 A | 5/2000 | Morris et al. |
| 6,097,565 A | 8/2000 | Sri-Jayantha et al. |
| 2003/0048569 A1 * | 3/2003 | Galloway et al. ......... 360/78.04 |

* cited by examiner

*Primary Examiner*—Andrew L. Sniezek
*Assistant Examiner*—Mitchell Slavitt
(74) *Attorney, Agent, or Firm*—David K. Lucente; Derek J. Berger

(57) ABSTRACT

Position error values are obtained from a transducer head while following a plurality of servo tracks with a servo loop that band-blocks a frequency range that includes F, a nominal rotation frequency. An estimated difference distribution is derived from the position error values, the difference distribution having a first frequency component at a positive frequency $\leq 2*F$. A scalar track squeeze magnitude indicator is derived from the estimated difference distribution so that the indicator to be transmitted depends on the frequency component.

27 Claims, 5 Drawing Sheets

SQUEEZE EVALUATIONS THAT ACCOUNT FOR LOW FREQUENCY COMPONENTS, IN A CONTROLLER USABLE IN A DATA HANDLING SYSTEM

CROSS-REFERENCE TO RELATED APPLICATIONS

This application claims the benefit of U.S. provisional application Ser. No. 60/424,581, filed Nov. 7, 2002, titled "Accurate AC Track Squeeze Measurement Method."

FIELD OF THE INVENTION

This application relates generally to servo positioning systems and more particularly to evaluating devices that use them.

BACKGROUND OF THE INVENTION

Disc drives read and write information along concentric tracks formed on discs. To locate a particular track on a disc, disc drives typically use embedded servo reference marks on the disc. These embedded fields are utilized by a servo subsystem to position a head over a particular track. The servo reference marks are written onto the disc when the disc drive is manufactured and are thereafter simply read by the disc drive to determine position.

Ideally, a head following the center of a track moves along a perfectly circular path around the disc. However, two types of errors prevent heads from following this ideal path. The first type of error is a written-in error that arises during the creation of the servo reference marks. Written-in errors occur because the write head used to produce the servo reference marks does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo reference marks. The track following errors can be caused by the same aerodynamic and vibrational effects that create written-in errors. In addition, track following errors can arise because the servo system is unable to respond fast enough to high frequency changes in the path defined by the servo reference marks.

Written-in errors are often referred to as repeatable run-out errors because they cause the same errors each time the head passes along a track. As track densities increase, these repeatable run-out errors begin to limit the track pitch. Specifically, variations between the ideal track path and the actual track path created by the imperfectly-placed servo reference marks can result in a track interfering with (or "squeezing") an adjacent track. This is especially acute when a first written-in error causes a head to be outside of an inner track's ideal circular path and a second written-in error causes the head to be inside of an outer track's ideal circular path. To avoid limitations on the track density, systems that evaluate and/or correct for repeatable run-out errors are employed.

A technique for repeatable run-out error compensation involves storing time-domain compensation values in the form of a compensation table on discs in the disc drive. These compensation values are injected into the servo loop to compensate for repeatable run-out errors. For example, "Zero Acceleration Path" (ZAP) compensation is so named because it adjusts each track's shape to be very circular, greatly reducing the need for accelerating a transducer head in track following.

Unfortunately, ZAP and similar schemes are very expensive to implement on each data handling system. To evaluate whether or which such schemes are necessary for a given zone, surface, disc drive, or product line, an evaluation of inter-track "squeeze" can be used. One problem with squeeze evaluation systems is that the measurements they generate are not readily repeatable. One way to address this problem is by ignoring frequency components at or below twice the spindle frequency, when computing squeeze indicators. At higher track densities, this is not acceptable. What is needed is a scheme for generating indicators of squeeze that takes low frequency components into account.

SUMMARY OF THE INVENTION

Rather than completely ignoring the low frequency components in an estimated difference distribution, the noise level in them is reduced by providing a servo feedback loop containing a band-block filter that blocks the control signal at a nominal rotation frequency, at least partially.

In a method embodiment of the present invention, several position error values are obtained from a transducer head while following a plurality of servo tracks with a servo loop that band-blocks a frequency range that includes F. An estimated difference distribution is derived from the position error values, the difference distribution having a first frequency component at a positive frequency $\leq 2*F$. A scalar track squeeze magnitude indicator is derived from the estimated difference distribution so that the indicator to be transmitted depends on the frequency component.

A device embodiment typically includes a rotatable disc stack configured to support at least one disc with a data surface containing many servo tracks, and also a servo loop configured to position the transducer head at any of the servo tracks. (Note that a "disc stack" can refer to a single disc simply supported by a co-rotating platform.) The controller is configured to cause the servo loop to band-block a frequency range that includes F while the transducer head receives several measurements at each of a selected plurality of the servo tracks. The controller is also configured to derive from the measurements an estimated difference distribution having a first frequency component at a positive frequency $\leq 2*F$. The controller is also configured to transmit a scalar track squeeze magnitude indicator derived from the estimated difference distribution so that the indicator depends on the frequency component.

Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of data storage device technology that are not a part of the present invention (or are well known in the art) are omitted for brevity, avoiding needless distractions from the essence of the present invention. For example, this document does not include specifics of how PES is manipulated in a conventional servo loop to control actuators that position transducer heads. Neither does it include specific methods for mounting fixed or removable discs into a stack. Specific techniques for implementing notch filters or other band-block filters are likewise omitted, typically being a matter of design choice to those of ordinary skill in servo controller design.

Definitions and clarifications of certain terms are provided in conjunction with the descriptions below, all consistent with common usage in the art but some described with greater specificity. A typical disc-based data storage system has a data storage disc that rotates at a controlled frequency during normal read/write operations. This frequency can also be called "$F_s$" or the spindle or stack rotation frequency. Energy in a position error signal that is concentrated at harmonics (integer multiples) of this controlled frequency is called repeatable runout ("RRO"). A "low frequency component" is a frequency component of a signal that is at $F_s$ or $2*F_s$ (i.e., at "1f" or "2f").

"Band-block filtering" refers to passing a signal through a filter having a gain that is less than a predetermined value within a predetermined contiguous "blocked" frequency range and greater than the predetermined value at some point above and below the predetermined frequency range. A "depth" of a notch filter or other band-block filter is a magnitude difference between the minimum gain therein and the highest measured "predetermined value." One of ordinary skill will be able to incorporate and optimize digital or analog filters for use in the present invention, in light of the teachings below.

Figure 1:
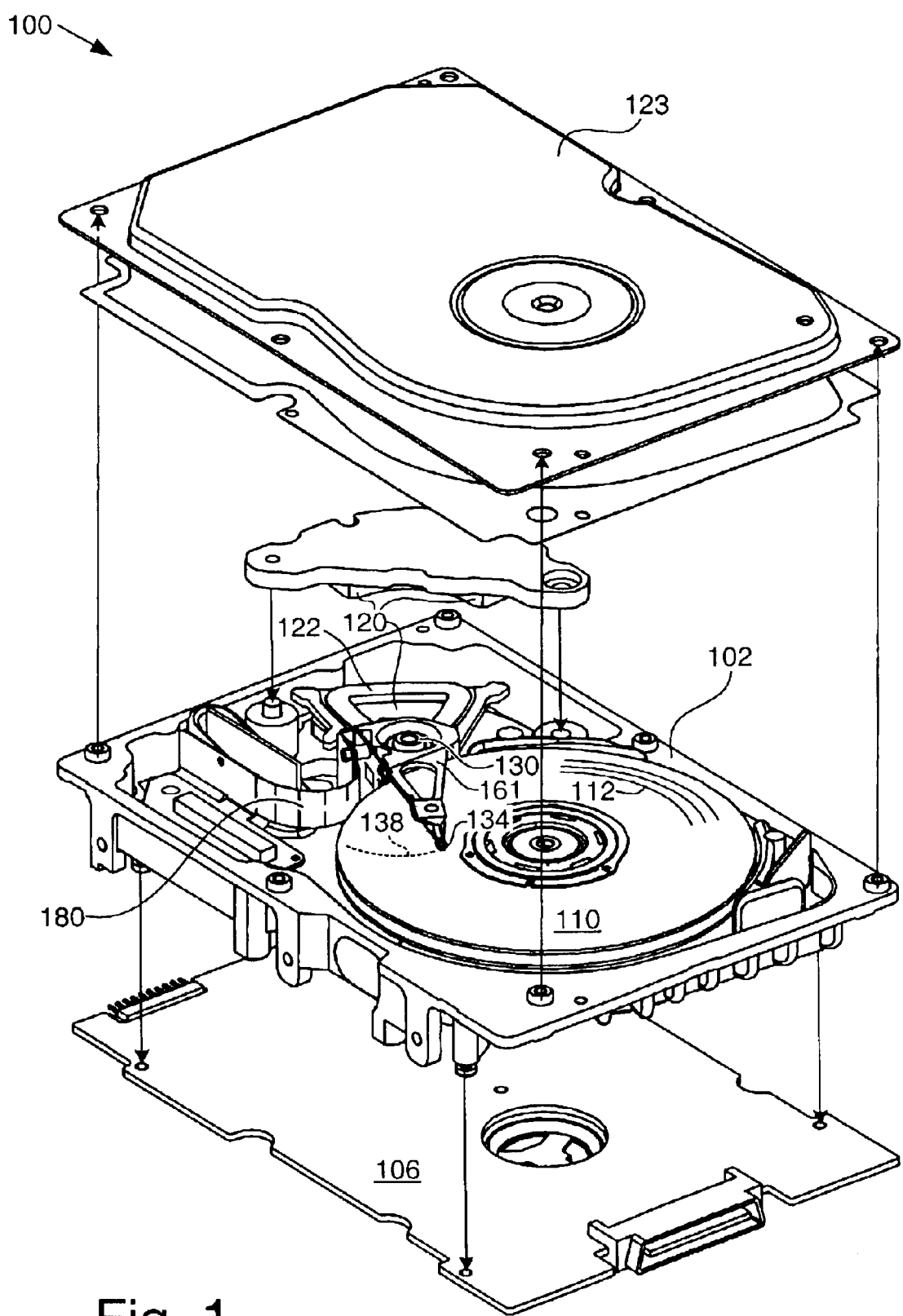
FIG. 1 shows a data storage system constructed in accordance with an embodiment of the present invention.

Turning now to FIG. 1, there is shown a data storage device 100 constructed in accordance with an embodiment of the present invention. System 100 is a disc drive including base 102 to which various components are mounted. Top cover 123 cooperates with base 102 conventionally to form a sealed chamber. The components include a spindle motor which rotates data storage discs 110 at hundreds or thousands of revolutions per minute. Information is written to and read from tracks 112 on discs 110 through the use of an actuator assembly 161, which rotates during a seek operation about a bearing shaft assembly 130 positioned adjacent discs 110. Actuator assembly 161 includes a plurality of actuator arms which extend above and below each disc 110, with one or more flexures extending from each of the actuator arms. Mounted at the distal end of each of the flexures is a transducer head 134 which includes an air-bearing slider enabling transducer head 134 to fly in close proximity above the corresponding surface of associated disc 110.

Servo and user data travels through transducer head 134 and flex cable 180 to control circuitry on controller board 106. (Controller board 106 is optionally configured with circuits described below with reference to FIG. 3, and to perform the methods described below with reference to FIG. 2). Flex cable 180 maintains an electrical connection by flexing as transducer heads 134 traverse tracks 112 along their respective radial paths 138. By "radial," it is meant that path 138 is substantially aligned with a radius of the disc(s) 110, although their directions may be offset from a perfectly radial direction by up to about 20 degrees due to head skew, as is understood in the art.

During a seek operation, the overall track position of transducer heads 134 is controlled through the use of a voice coil motor (VCM), which typically includes a coil 122 fixedly attached to actuator assembly 161, as well as one or more permanent magnets 120 which establish a magnetic field in which coil 122 is immersed. The controlled application of current to coil 122 causes magnetic interaction between permanent magnets 120 and coil 122 so that coil 122 moves. As coil 122 moves, actuator assembly 161 pivots about bearing shaft assembly 130 and transducer heads 134 are caused to move across the surfaces of discs 161 between the inner diameter and outer diameter of the disc(s) 161. Fine control of the position of head 134 is optionally made with a microactuator (not shown) that operates between the head 134 and the actuator arm(s).

Figure 2:
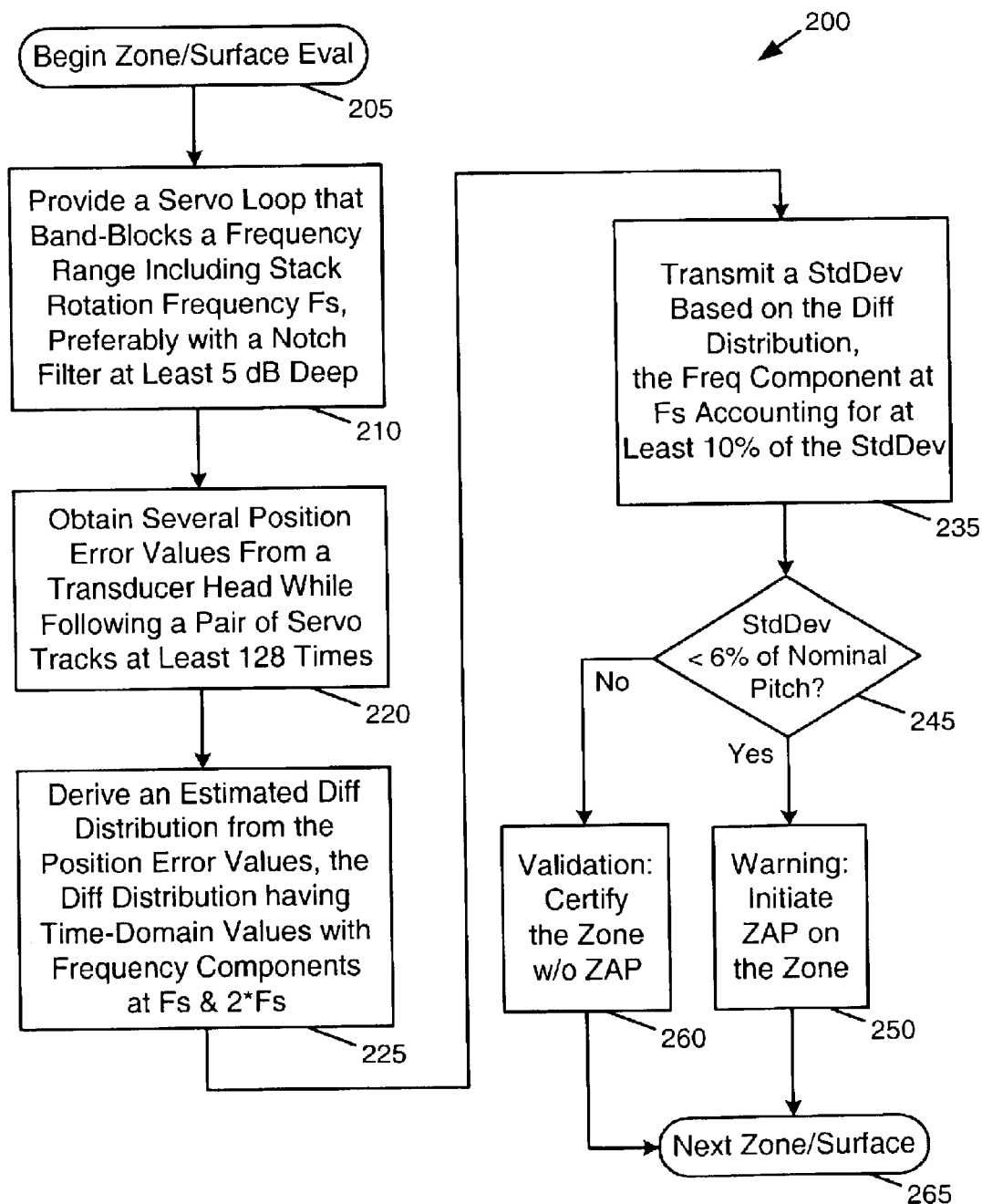
FIG. 2 shows a fairly simple digital processing method of the present invention, one that can be performed by a controller of FIG. 1.

FIG. 2 shows a fairly simple digital processing method 200 for evaluating an annular zone or data surface, comprising steps 205 through 265. Method 200 can be repeated to certify an entire data handling system or to perform "Zero Acceleration Path" (ZAP) compensation on part or all of the system. In step 210, a servo loop is configured to band-block a frequency range including $F_s$, preferably with a notch filter 5 to 30 decibels deep. The notch filter is preferably activated selectively so that it need not be present in the loop during normal read/write operations. Several position error values are obtained from a transducer head 220. An estimated difference distribution is derived therefrom, including a frequency component at F and/or 2*F 225. A standard deviation based on the distribution is calculated and transmitted 235. (Note that countless other "distribution spread" indicators, such as variance and range, are available to one of ordinary skill and viable for use in the present invention.) A most-preferred formula is provided below as Equation (3).

A drive-level dynamic track squeeze formula is defined as $$ACS = \frac{1}{\sqrt{2}} \left\{ \sqrt{\frac{1}{K(M-1)} \sum_{m=1}^{M-1} \sum_{k=0}^{K-1} \text{D\_Head\_Position}RRO[m, k]^2} \right\} \quad (1)$$

In Equation (1), m is a selected track number and M is the total number of tracks on a given data surface. Similarly, k is a selected sector number and K is the total number of sectors. D_Head_PositionRRO is the head position repeatable runout (RRO) difference of two successive or proximate tracks without considering first spindle harmonic (1f) and second spindle harmonic (2f) components. D_Head_PositionRRO is defined as the difference of RRO of two successive or proximate tracks multiplied by open loop gain PC:

$$\frac{D\_Head\_Position}{RRO[m,k]} = D\_PESRRO[m,k] * PC \qquad (2)$$

$$= (PESRRO[m,k] - PESRRO[m+1,k]) * PC$$

$$= \frac{1}{N}\left(\sum_{n=1}^{N} PES[n,m,k] - \sum_{n=1}^{N} PES[n,m+1,k]\right) * PC$$

In Equation (2), N is number of revolutions in RRO collection. PES[n,m,k] is a position error signal (PES) value of sector k on track m in the nth revolution.

During RRO measurement, noise introduces a small variation in RRO data at each measurement. The variation will be amplified by PC in Equation (2). PC has large gain at 1f and 2f frequencies, so D_Head_PositionRRO becomes unacceptable for 1f and 2f dynamic squeeze measurement. As a result, 1f and 2f dynamic squeeze was not considered in the above drive level dynamic track squeeze measurement method. However, 1f and 2f dynamic squeeze may exist due to the 1f and 2f components in written-in repeatable runout (WIRRO). If it is possible to include 1f and 2f components with a reduced loss of accuracy, one or both of them should be considered in an evaluation of a data surface's dynamic track squeeze.

A preferred formula for estimating drive-level dynamic track squeeze is $$ACS = \frac{1}{\sqrt{2}} \left\{ \sqrt{\frac{1}{K(M-1)} \sum_{m=1}^{M-1} \sum_{k=0}^{K-1} D\_Head\_PositionRRO[m,k]^2} \right\} \qquad (3)$$

where D_Head_PositionRRO is the head position RRO difference between two successive or proximate tracks considering all spindle harmonic components.

Figure 3:
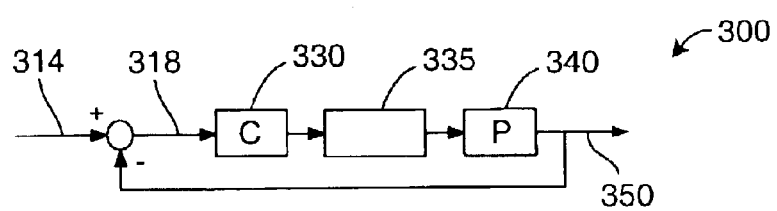
FIG. 3 shows a block diagram of a preferred servo feedback loop suitable for use with the present invention.

Returning now to FIG. 2, it is determined whether the calculated indicator is less than a predetermined threshold 245. If so, a warning signal is generated 250 that initiates ZAP correction on the zone or surface under evaluation. Otherwise, a validation signal is generated 260 that indicates a "low enough" dynamic track squeeze. This avoids a time-consuming re-work, in the simple example of method 200. FIG. 3 shows a block diagram of a preferred servo feedback loop 300 suitable for use with the present invention. Desired position 314 is a loop input and measured position 350 is a loop output. Difference 318 is a position error signal (PES) fed through controller 330, filter 335 and plant 340. Filter 335 is preferably a notch filter about 15 decibels deep at the spindle rotation frequency, and able to be selectively activated. Note that the amplification of PC in Equation (2) is limited because of filter 335. This can cause a reduced amplification of drive level if dynamic squeeze.

Figure 4:
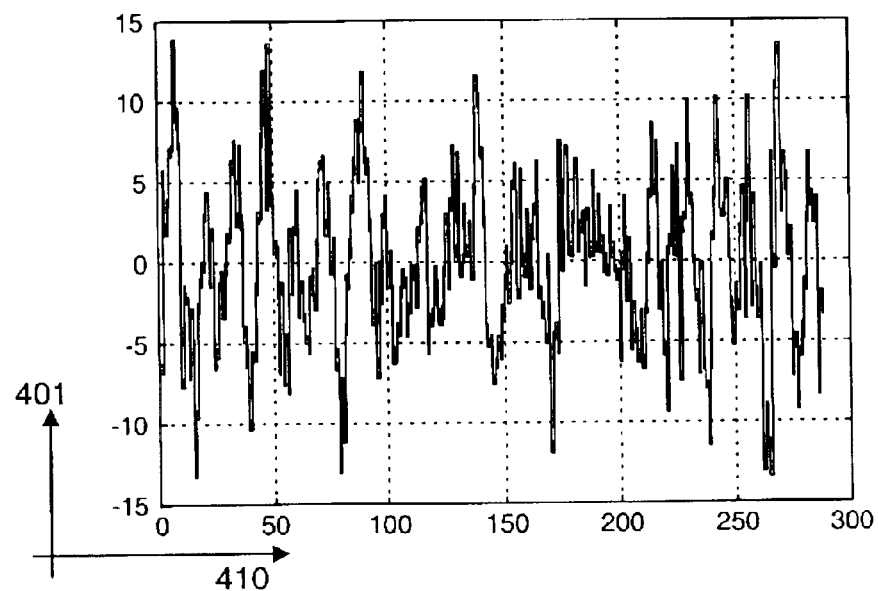
FIG. 4 shows inter-track repeatable runout (RRO) differences plotted against sector number for a system not using the present invention.

FIG. 4 shows inter-track repeatable runout (RRO) differences 401 (in servo counts, each equal to 1/256 of one nominal track width) plotted against sector number 410 for a data handling system not using the present invention. These inter-track differences are obtained by repeatedly measuring each of two adjacent tracks in one annular zone. Although there are ten such plots overlaid in FIG. 4, they are indistinguishable as shown because the data points shown coincide within 1.5 servo counts.

Figure 5:
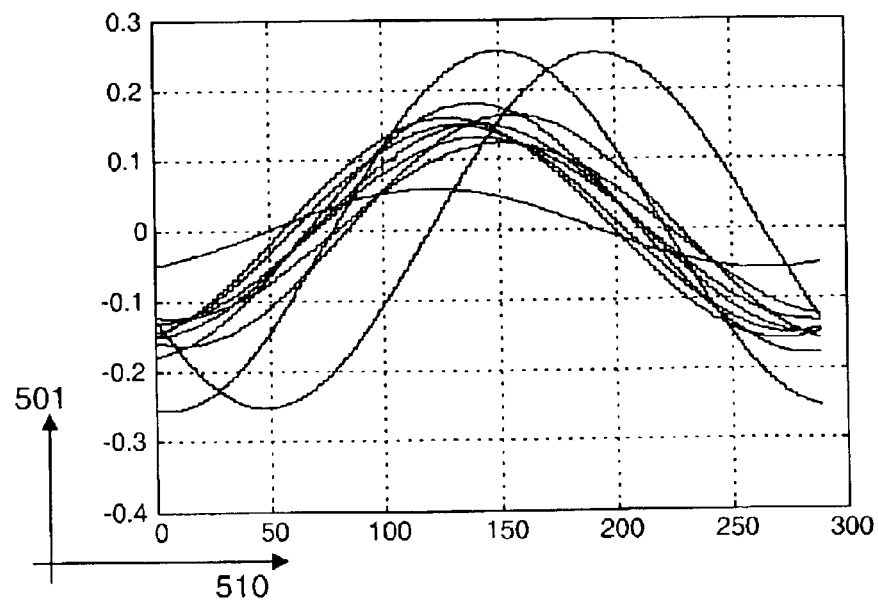
FIG. 5 shows the "1f" frequency component plotted against sector number for the same data as shown in FIG. 4.

FIG. 5 shows the "1f" frequency component amplitude 501 plotted against sector number 510 for the same data as shown in FIG. 4. Note that exactly one sine wave is shown for each because the frequency components each have the same frequency as the spindle rotation. The sine amplitudes of RRO difference at 1f frequency from 10 timemeasurements are as follows:

TABLE 1

|  | Sine Amplitudes |
| --- | --- |
| 1 | 0.25 |
| 2 | 0.26 |
| 3 | 0.18 |
| 4 | 0.15 |
| 5 | 0.16 |
| 6 | 0.13 |
| 7 | 0.12 |
| 8 | 0.15 |
| 9 | 0.06 |
| 10 | 0.16 |
| Mean | 0.16 |
| Sigma | 0.06 |
| SNR = Mean/Sigma | 2.79 |

Table 1 also shows a mean, standard deviation, and signal-to-noise ratio for this distribution of amplitudes. Despite the apparent consistency of the data shown in FIG. 4, note that a signal-to-noise ratio of 2.79 is undesirably low, indicating that the inclusion of the "1f" frequency component will lead to inconsistent results in any dynamic squeeze determination.

Figure 6:
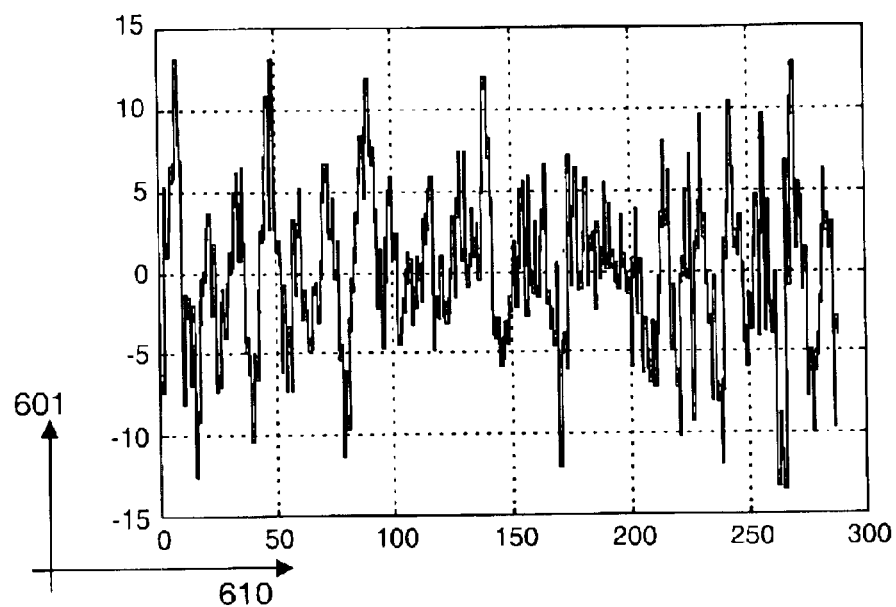
FIG. 6 shows inter-track RRO differences plotted like those of FIG. 4, but for a system using the present invention.

FIG. 6 shows inter-track repeatable runout (RRO) differences 601 (in servo counts) plotted against sector number 610 for a data handling system using a 15 decibel notch filter at the spindle frequency in the servo feedback loop. These inter-track differences are obtained by repeatedly measuring the same two tracks used to generate FIG. 4. Although there are ten such plots overlaid in FIG. 6, they are indistinguishable as shown because the data points shown coincide within 1.5 servo counts.

Figure 7:
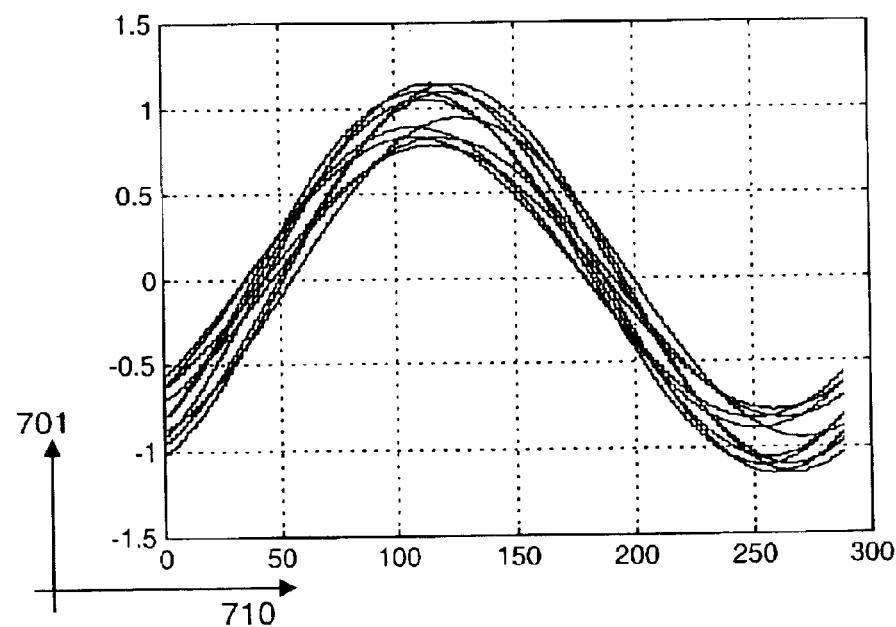
FIG. 7 shows the "1f" frequency component plotted against sector number for the same data as shown in FIG. 6.

FIG. 7 shows the "1f" frequency component amplitude 701 plotted against sector number 710 for the same data as shown in FIG. 6. The sine amplitudes of RRO difference at 1f frequency from 10 time measurements are as follows:

TABLE 2

|  | Sine Amplitudes |
| --- | --- |
| 1 | 0.77 |
| 2 | 0.82 |
| 3 | 1.05 |
| 4 | 0.94 |
| 5 | 0.82 |
| 6 | 1.09 |
| 7 | 1.10 |
| 8 | 1.14 |
| 9 | 0.89 |
| 10 | 1.14 |
| Mean | 0.98 |
| Sigma | 0.14 |
| SNR = Mean/Sigma | 6.78 |

Table 2 also shows a mean, standard deviation, and signal-to-noise ratio for this distribution of amplitudes. Note that the RRO difference signal at the spindle frequency is much more repeatable because of filter 335, in that the SNR increases from 2.79 (in Table 1) to 6.78 (in Table 2).

Figure 8:
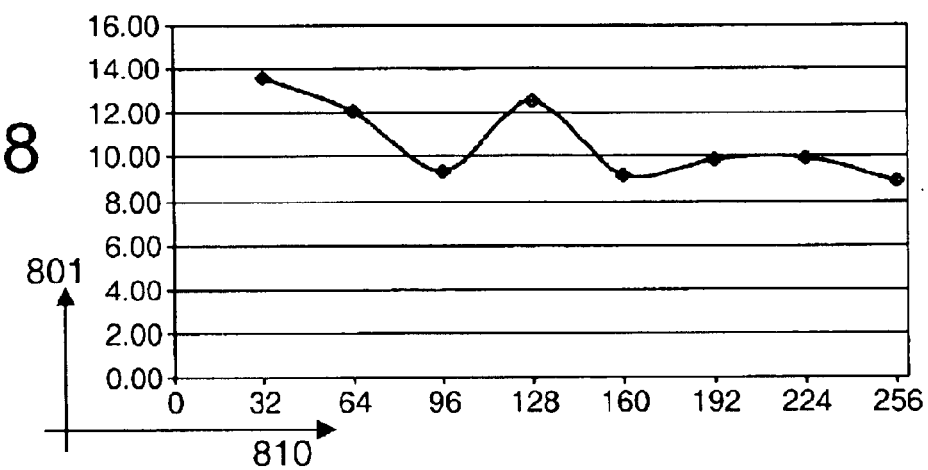
FIG. 8 represents an empirical measurement of how an estimated dynamic track squeeze varies with the number of revolutions in data gathering.

FIG. 8 represents an empirical measurement of how an estimated dynamic track squeeze 801 (as a percent of a nominal track pitch) varies with the number of revolutions 810 in data collection. Without using filter 335, RRO measurements were performed with a steadily increasing number of revolutions: 32, 64, 96, 128, 160, 192, 224, and 256. For each number of revolutions 810, the collected data were used to calculate the track squeeze 801. Note that 1f and 2f frequency components are included, but that the resulting estimated squeeze 801 fluctuates by more than 20% of its value, and thus seems unreliable.

Figure 9:
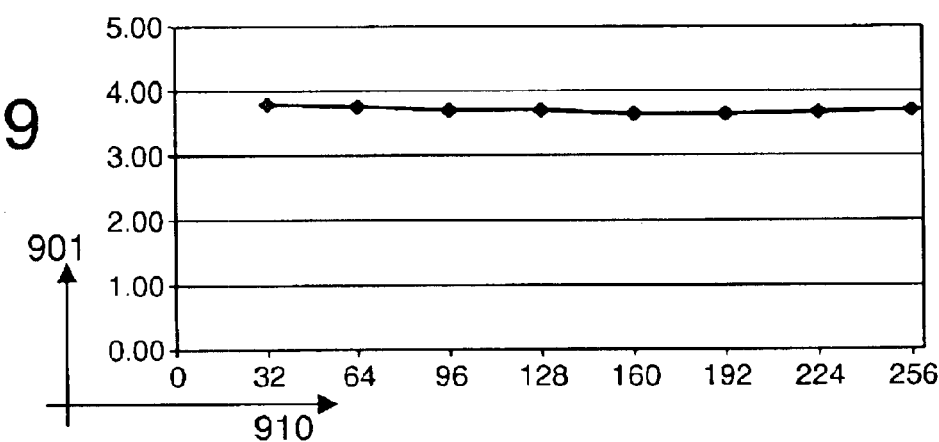
FIG. 9 represents another estimated dynamic track squeeze plotted against the number of revolutions in data gathering.

FIG. 9 represents another estimated dynamic track squeeze 901 (as a percent of nominal) plotted against the number of revolutions 910 in data collection. Note that no band-block filter was used to attenuate at the spindle frequency. The estimated squeeze 901 is stable, but only because the 1f frequency component was excluded.

Figure 10:
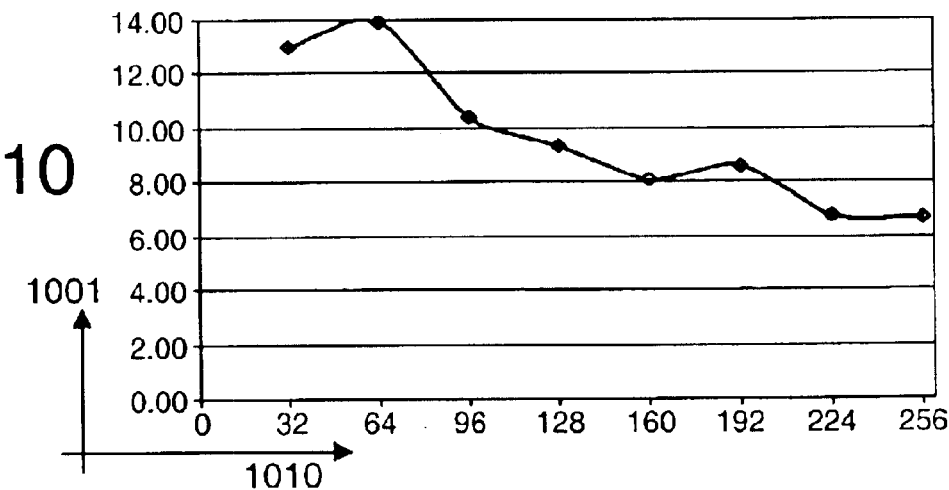
FIG. 10 represents yet another estimated dynamic squeeze plotted against the number of revolutions in data gathering.

FIG. 10 represents yet another estimated dynamic squeeze 1001 (as a percent of nominal) plotted against the number of revolutions 1010 in data collection. Now implementing the present invention, band-block filter 335 was used to attenuate at the spindle frequency in the servo feedback loop 300. Despite the inclusion of 1f and 2f frequency components, the estimated squeeze 1001 fluctuates by only about 10% of its value. The estimated squeeze converges to a level less than 10% of the nominal track width in less than 128 revolutions of data collection, moreover.

For the computations in FIGS. 8–10 above, the difference distributions were derived based on measurements from 11 adjacent tracks (i.e. 10 successive pairs of successive tracks). Adaptive feedforward cancellation (AFC) weights were frozen. Open loop gain PC was obtained by drive level measurement, and open loop Bode below 300 hertz was computed based on a second order resonant model for the voice coil motor.

Alternatively characterized, a first embodiment of the present invention is a method of evaluating a data handling system having thousands of servo tracks on a rotatable data surface. The method includes a step of gathering several position error values from a transducer head while following a plurality of the servo tracks. Each of these servo tracks is preferably followed at least 32 times, and more preferably at least 256 times. This is done with a servo loop that band-blocks a frequency range that includes a stack rotation frequency F. The position error values are used to derive an estimated difference distribution having a frequency component or two at positive frequencies $\leq 2*F$. Note that derivation of this estimated difference distribution can begin during or after the value-gathering step. A scalar track squeeze magnitude indicator is transmitted after being derived from the estimated difference distribution so that the indicator depends on the frequency component. This embodiment is especially useful in applications where one of these low frequency components accounts for at least 10% of the indicator.

In a second alternative embodiment, the first alternative embodiment is varied so that the frequency component has a magnitude X and an incremental fractional change $\Delta X/X$. The track squeeze indicator has a magnitude Y and an incremental fractional change $\Delta Y/Y$. In this embodiment, Y depends on X enough so that $\Delta X/X < 100*\Delta Y/Y$. In this circumstance, the indicator-transmitting step is more effective.

In a third, the first or second alternative embodiment is varied so that the indicator-transmitting step includes steps of (1) computing a sum by adding several terms each based on a square of a respective difference value of the difference distribution, (2) deriving the scalar track squeeze magnitude indicator partially based on the sum. (Note that a digital processor that performs step 235 of FIG. 2 inherently performs these steps.) Most preferably, the indicator-transmitting step also includes a step of generating the track squeeze indicator as a Boolean output of a comparison between a predetermined threshold and an estimated dynamic track squeeze value.

In a fourth, an alternative embodiment described above is varied so that the value-gathering step includes a step of providing a notch filter with a depth large enough so that a signal-to-noise ratio of an amplitude of the frequency component is at least 2.8. Also the indicator-transmitting step is performed by transmitting a warning as the track squeeze indicator if a dynamic track squeeze exceeds a predetermined threshold less than about 10% of a nominal track pitch, and otherwise generally not transmitting the warning.

In a fifth, the value-gathering step includes a step of providing a notch filter with a depth of at least 5 decibels at F in the servo loop. Also the indicator-transmitting step is performed by transmitting a validation signal as the track squeeze indicator if a dynamic track squeeze falls below a predetermined threshold and otherwise generally not transmitting the validation signal.

In a sixth, the deriving step includes a step of deriving the difference distribution as an inter-track repeatable runout difference distribution between at least one pair of successive servo tracks on the data surface. Also the data handling system is conditionally modified based on the track squeeze indicator. (Note that the indicator has a scalar numerical or Boolean value.)

In a seventh, the positive frequency of the (first) frequency component is $2*F$, and in which the track squeeze indicator derived in the indicator-transmitting step also depends on a second frequency component having a frequency of F. Also the difference distribution essentially consists of a series of several difference values. Also the indicator-transmitting step includes a step of deriving the track squeeze indicator as an arithmetic combination partially based on the difference values.

An eighth alternative embodiment of the present invention is a controller that optionally performs or is configured to perform one of the above-described method embodiments. The controller preferably operates in a data handling system that also includes a rotatable stack of discs having a nominal stack rotation frequency F and a data surface with numerous servo tracks. It also includes a servo loop configured to position the transducer head at any of the servo tracks.

In a ninth alternative embodiment, the eighth alternative embodiment is varied so that the controller causes the servo loop to band-block a frequency range that includes F while the transducer head receives several measurements at each of a selected plurality of the servo tracks. The controller is also configured to derive from the measurements an estimated difference distribution having a first frequency component at a positive frequency $\leq 2*F$. The controller is also configured to transmit a Boolean or real-valued (scalar) track squeeze magnitude indicator derived from the estimated difference distribution so that the indicator depends on the frequency component.

In a tenth, the eighth or ninth alternative embodiment is varied so that the servo loop includes a band-block filter that is selectively activated by the controller, the band-block filter having a depth of several decibels (but not exceeding 30 dB) and a band-block frequency range that includes F.

In an eleventh, an alternative "system" embodiment described above is an integral system (i.e. capable of evaluation methods described above without specialized manufacturing equipment, in a user environment) including both the disc stack and the controller.

All of the structures and methods described above will be understood to one of ordinary skill in the art, and would enable the practice of any described embodiment without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, one of ordinary skill would recognize that the band-block filter in the servo feedback loop of FIG. 3 can be implemented in other ways. In addition, although the preferred embodiments described herein are largely directed to fixed magnetic media like the discs 110 of FIG. 1, it will be appreciated by those skilled in the art that many teachings of the present invention can be applied in other contexts, such as optical and/or removable data storage media, without departing from the scope and spirit of the present invention.

What is claimed is:

1. A controller configured to cause a servo loop to band-block a frequency range that includes a nominal frequency F while several measurements are received at each of a selected plurality of positions, the controller also configured to derive from the measurements an estimated difference distribution having a first frequency component at a positive frequency of at most about 2*F, the controller also configured to transmit a scalar squeeze magnitude indicator derived from the estimated difference distribution so that the indicator depends on the frequency component.

2. The controller of claim 1 in which the servo loop includes a band-block filter that can be activated selectively by the controller.

3. The controller of claim 1 in which the servo loop includes a notch filter having a depth of several decibels and a band-block frequency range that includes F.

4. The controller of claim 1 in which the servo loop includes a notch filter having a depth of at most about 30 decibels and a band-block frequency range that includes F.

5. A data handling system comprising the controller of claim 1 and a disc stack configured to rotate at a rotational frequency equal to F.

6. The controller of claim 1 in which the indicator is a Boolean signal.

7. A method comprising steps of:
(a) providing a data handling system having a rotatable data surface containing thousands of servo tracks;
(b) obtaining several position error values while following a plurality of positions in at least one selected pair of the servo tracks with a servo loop that band-blocks a frequency range that includes a nominal spindle rotation frequency $F_s$;
(c) deriving an estimated difference distribution from the position error values, the difference distribution having a first frequency component at a positive frequency of at most about 2*$F_s$; and
(d) transmitting a scalar track squeeze magnitude indicator derived from the estimated difference distribution so that the indicator depends on the frequency component.

8. The method of claim 7 in which the difference distribution from the deriving step (c) essentially consists of a series of several difference values, and in which the transmitting step (d) includes a step (d1) of deriving the track squeeze indicator as a Boolean comparison between a predetermined threshold and an arithmetic combination partially based on the difference values.

9. The method of claim 7, further comprising a step (e) of deciding how to modify the data handling system based on the track squeeze indicator.

10. A method comprising steps of:
(a) obtaining several position error values while following a plurality of positions with a servo loop that band-blocks a frequency range that includes a nominal rotation frequency F;
(b) deriving an estimated difference distribution from the position error values, the difference distribution having a first frequency component at a positive frequency of at most about 2*F; and
(c) transmitting a scalar track squeeze magnitude indicator derived from the estimated difference distribution so that the indicator depends on the frequency component.

11. The method of claim 10 in which the first frequency component accounts for at least 10% of the indicator.

12. The method of claim 10 in which the deriving step (b) begins before the obtaining step (a) is finished.

13. The method of claim 10 in which the obtaining step (a) is performed by receiving the position error values while following each of a plurality of servo tracks at least 32 times.

14. The method of claim 10 in which the obtaining step (a) is performed by receiving the position error values while following each of a plurality of servo tracks at least 256 times.

15. The method of claim 10 in which the transmitting step (c) includes steps of:
(c1) computing a sum by adding several terms each based on a square of a respective difference value of the difference distribution; and
(c2) deriving the scalar track squeeze magnitude indicator partially based on the sum.

16. The method of claim 10 in which the transmitting step (c) includes a step (c1) of generating the track squeeze indicator as a Boolean output of a comparison between a predetermined threshold and an estimated dynamic track squeeze value.

17. The method of claim 16 in which the step (c1) includes steps of:
(c1A) squaring a respective value from the estimated difference distribution to generate several squared values; and
(c2A) deriving the indicator based on the squared values.

18. The method of claim 10 in which the transmitting step (c) is performed by transmitting a warning as the track squeeze indicator if a dynamic track squeeze exceeds a predetermined threshold less than about 10% of a nominal track pitch, and otherwise generally not transmitting the warning.

19. The method of claim 10 in which the transmitting step (c) is performed by transmitting a validation signal as the track squeeze indicator if a dynamic track squeeze falls below a predetermined threshold and otherwise generally not transmitting the validation signal.

20. The method of claim 10 in which the obtaining step (a) includes a step of providing a notch filter with a depth of at least 5 decibels at F in the servo loop.

21. The method of claim 10 in which the obtaining step (a) includes a step of providing a notch filter with a depth large enough so that a signal-to-noise ratio of an amplitude of the frequency component is at least 2.8.

22. The method of claim 10, further comprising a step (d) of deciding whether to modify the data handling system based on the track squeeze indicator.

23. The method of claim 10 in which the deriving step (b) includes a step (b1) of deriving the difference distribution as an inter-track repeatable runout difference distribution between at least one pair of successive servo tracks on a data surface.

24. The method of claim 10 in which the positive frequency of the first frequency component is 2*F, and in which the track squeeze indicator derived in the transmitting step (c) also depends on a second frequency component having a frequency of F.

25. The method of claim 10 in which the difference distribution from the deriving step (b) essentially consists of a series of several difference values, and in which the transmitting step (c) includes a step (c1) of deriving the track squeeze indicator as an arithmetic combination partially based on the difference values.

26. The method of claim 10 in which the obtaining step (a) is performed by receiving the position error values while following each of a plurality of servo tracks at least 32 times, in which the obtaining step (a) includes a step of providing a notch filter with a depth of at least 5 decibels at F in the servo loop, in which the first frequency component accounts for at least 10% of the indicator, in which the transmitting step (c) includes calculating the indicator as a Boolean output of a comparison between a predetermined threshold of about 6% of a nominal track pitch and a standard deviation based on several values of the difference distribution, and further comprising a step (d) of deciding whether to modify the data handling system based on the track squeeze indicator.

27. The method of claim 10 in which the difference distribution from the deriving step (b) essentially consists of a series of several difference values, and in which the transmitting step (c) includes a step (c1) of deriving the track squeeze indicator as a Boolean comparison between a predetermined threshold and an arithmetic combination partially based on the difference values.

* * * * *